April 26, 1960 H. J. BUTLER ET AL 2,934,173
DISC BRAKES
Filed June 18, 1957
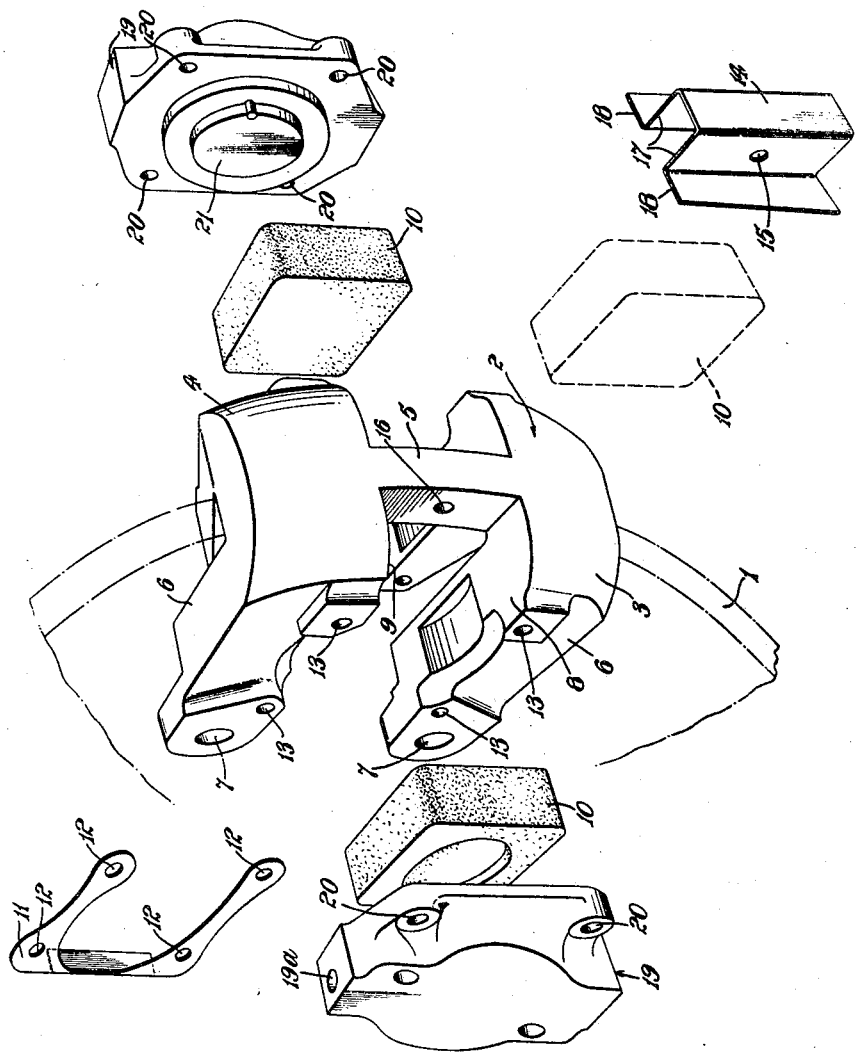
INVENTORS
Henry James Butler
Joseph Wright
by Benj. F. Rauber
their attorney

United States Patent Office 2,934,173
Patented Apr. 26, 1960

2,934,173
DISC BRAKES

Henry James Butler, Sutton Coldfield, and Joseph Wright, Meriden, near Coventry, England, assignors to Dunlop Rubber Company Limited, London, England, a British company Application June 18, 1957, Serial No. 666,354

11 Claims. (Cl. 188—73)

Our invention relates to disc brakes of the type in which friction pads supported in a caliper type housing are pressed against opposite surfaces of a rotating disc straddled by said housing, the pads extending over a portion only of the path of rotation of the side surfaces of the disc.

An example of such a disc brake to which the present application may be applied is illustrated in Patent 2,790,516 of April 30, 1957, to Wright et al.

Our present invention provides a disc brake having a housing of rigid and compact construction in which the friction pads may be held from rotation with the disc as in said Patent 2,790,516 for example, and in which worn friction pads may be readily replaced or inspected upon the removal of a retainer or retaining member. For the ready removal and replacement of the friction pads without disassembling working parts of the brake, the housing is formed of a pair of circumferentially spaced elements straddling the friction disc in such manner as to form retainers or stops against the tendency for the brake pads to be carried in a rotational direction by the brake disc. These two elements are connected by a web, preferably formed integrally therewith as a single casting, and which has a width about the same as that of the brake disc so as to form a passageway through which the brake pads may be removed radially outwardly and replaced by a new brake pad.

The pads are retained in position relative to the disc and against radially outward movement in normal operation by a retainer secured to the web as, for example, by a bolt. When it is desired to inspect a brake pad or to replace it, it is therefore necessary only to remove this retainer and slide the worn brake pad through the passageway and slide a new replacement pad therethrough into operative position and then replace the retainer.

The various features of our invention are illustrated, by way of example, in the accompanying drawing which is an exploded view of the various parts of the brake in a relative position to each other and also shows in broken lines a brake pad in removed position ready for insertion as a replacement.

In the embodiment of the invention shown in the drawing a disc brake for a motor-vehicle comprises an annular disc 1 adapted to be secured at its inner periphery to a wheel or axle shaft to rotate with said wheel or shaft in the known manner. Straddling the outer periphery of said disc 1 is a caliper type housing 2 comprising two caliper parts 3, 4 connected together by a web 5, integral with said parts 3, 4, extending circumferentially of the disc 1 and adjacent the outer periphery thereof. One limb 6 of each caliper part is extended radially-inwardly on one side of the disc 1, whereby the housing may be non-rotatably secured to the axle casing or a part of the wheel assembly as by bolts passed through the holes 7 in each limb 6.

Each pair of adjacent sides 8, 9 of the two caliper parts 3, 4 are parallel to accommodate a square friction pad 10, which is axially slidable to contact the adjacent radially-extending braking surface of the disc 1. One such friction pad 10 is disposed on each opposite side of the disc. Radially-inward movement of the pads 10 is prevented by a pair of inner retaining members 11 which bridge the two caliper parts 3, 4 and are secured thereto by bolts passed through holes 12 in the members 11 and screwed into holes 13 in the caliper. Radially-outward movement of the pads is prevented by a member 14 of trough-section which straddles the web 5 and is detachably secured thereto as by a bolt passed through the holes 15 and 16 in the trough member 14 and the web 5, respectively. The free ends of the parallel arms 17 of the trough member 14 are each turned outwardly at right angles to the arms 17 to form stop members 18 for the adjacent radially-outer sides of the friction pads 10, to hold said pads securely between the caliper faces 8 and 9.

A cylinder 19, adapted to be connected to a source of fluid pressure through a connection 19a, is secured to the housing, i.e. to the two caliper parts 3 and 4, on each side of the disc 1 as by the bolts holding the plates 11 in position and passing through holes 20 in the cylinder block 19, as well as through the holes 12, before being screwed into the holes 13, and a piston 21, slidable in the cylinder 19 under the action of said fluid pressure, acts substantially through the center of pressure of the associated pad 10 to force it into frictional engagement with the disc 1. Automatic pad retraction and wear adjustment devices (not shown) may be fitted. The friction pads 10 may be provided with metal backing plates bonded or otherwise secured thereto.

The brake operates in the manner described in said Patent 2,790,516, braking torque being taken on the parallel sides 8, 9 of the limbs 6 of the caliper parts 3, 4. The pads 10 may be readily replaced by undoing the nut and bolt assembly and removing the trough-sectioned pad-retaining members 14. The web 5 of metal, joining the two caliper parts 3, 4 has the advantage that the pad-retaining members 14 may be secured thereto and it also renders the housing a one-piece unit and thus facilitates handling and fitting.

Having now described our invention—what we claim is:

1. A disc brake which comprises a rotatable disc, a non-rotatable caliper type housing comprising a pair of pad retaining portions spaced circumferentially of said disc and each having a pair of legs straddling said disc and closely spaced therefrom and forming on each side of said disc a friction pad receiving space, and a web outside the periphery of said disc and closely adjacent thereto connecting said pad retaining portions and of a thickness to provide a withdrawal passage from each said pad receiving space, a friction pad in said space held by said legs from movement about the axis of said disc, the legs on each side of said disc having means to restrict the radially inward movement of said pads pressure applying means on each side of said disc spanning said pad receiving space and secured to said legs and having a pressure contact with said pads to move said pads to contact the opposite sides of said disc and a retainer removably secured to said web and extending into said withdrawal space to retain said friction pad from radially outward movement.

2. The disc brake of claim 1 in which the legs on opposite sides of said pad receiving space having flat surfaces at opposite sides of said pad receiving space and said friction pad has surfaces abutting said flat surfaces.

3. The disc brake of claim 2 in which the surfaces of said friction pads abutting said flat surfaces are flat.

4. The disc brake of claim 1 in which said retainer comprises a portion removably secured to said web and sidewise extensions extending into said withdrawal passage.

5. The disc brake of claim 1 in which said pressure applying means comprises a cylinder block and a piston slidable therein in driving contact with its friction pad.

6. The disc brake of claim 1 in which said retainer comprises a central channel fitting over said web and sidewise extensions.

7. The disc brake of claim 1 having inner retaining members secured to said pairs of legs on each side of said disc abutting the radially inward faces of said pads.

8. The disc brake of claim 1 in which the faces of said friction pads are rectangular.

9. The disc brake of claim 1 in which said friction pad receiving space has opposed faces parallel to a radial median line.

10. The disc brake of claim 1 in which said means to restrict radial inward movement of said pad comprises a plate mounted on each axial outward face of said housing and having a flange extending toward said disc at the inner face of said pad.

11. The disc brake of claim 1 having a backing plate for each said brake pad, said backing plate being of a diameter less than the dimensions of said friction pad and contacting said friction pad with the perimeter of the backing plate within the perimeter of the face of the friction pad in contact with it.

References Cited in the file of this patent

UNITED STATES PATENTS

| | | |
|---|---|---|
| 2,687,786 | Kelley | Aug. 31, 1954 |
| 2,754,936 | Butler | July 17, 1956 |
| 2,762,460 | Butler | Sept. 11, 1956 |

FOREIGN PATENTS

| | | |
|---|---|---|
| 1,047,807 | France | July 29, 1953 |
| 742,338 | Great Britain | Dec. 21, 1955 |